US011112011B1

(12) United States Patent
Murphy

(10) Patent No.: US 11,112,011 B1
(45) Date of Patent: Sep. 7, 2021

(54) CONTROLLABLY OPENING WATER SUPPLY LINE DOORS

(71) Applicant: Patrick M. Murphy, Painesville, OH (US)

(72) Inventor: Patrick M. Murphy, Painesville, OH (US)

( * ) Notice: Subject to any disclaimer, the term of this patent is extended or adjusted under 35 U.S.C. 154(b) by 0 days.

(21) Appl. No.: 16/508,878

(22) Filed: Jul. 11, 2019

Related U.S. Application Data

(60) Provisional application No. 62/716,484, filed on Aug. 9, 2018.

(51) Int. Cl.
*F16K 1/20* (2006.01)
*F16L 55/10* (2006.01)

(52) U.S. Cl.
CPC .......... *F16K 1/2028* (2013.01); *F16K 1/2007* (2013.01); *F16L 55/1018* (2013.01); *Y10T 137/402* (2015.04)

(58) Field of Classification Search
CPC .. F16K 1/16; F16K 1/18–2092; F16K 15/181; F16L 55/055; F16L 59/161; F16L 55/1018; E02B 8/04; E02B 8/045; Y10T 137/402
USPC ............ 137/236.1; 405/80, 87, 99, 100, 127
See application file for complete search history.

(56) References Cited

U.S. PATENT DOCUMENTS

| | | | | |
|---|---|---|---|---|
| 141,747 A | * | 8/1873 | Armstrong et al. | ...... F16K 1/16 251/299 |
| 994,347 A | * | 6/1911 | Thorsby | .................. A01J 5/044 251/114 |
| 999,584 A | * | 8/1911 | Orton | ......................... F16K 1/20 251/303 |
| 1,386,004 A | * | 8/1921 | Kimber | ................. F16K 1/2028 251/85 |
| 3,260,277 A | * | 7/1966 | Kratsios | ................ F16K 1/2057 137/317 |
| 4,144,902 A | * | 3/1979 | Mahr | .................... F16K 1/2028 137/246.22 |
| 4,276,725 A | * | 7/1981 | Ash | .......................... E04B 1/98 49/141 |
| 4,788,999 A | * | 12/1988 | Dalpane | ................. F16K 17/02 137/514 |
| 5,295,503 A | * | 3/1994 | Meyer | .................... A62C 35/58 137/552 |
| 5,336,018 A | * | 8/1994 | Maudal | ................... E02B 1/003 137/236.1 |
| 5,472,293 A | * | 12/1995 | Roller | ..................... E02B 8/045 405/87 |

(Continued)

FOREIGN PATENT DOCUMENTS

| | | | | | |
|---|---|---|---|---|---|
| CH | | 197060 A | * | 4/1938 | ........... F16K 15/031 |
| WO | WO-2018214678 A1 | | * | 11/2018 | ............... F16K 1/20 |

*Primary Examiner* — Kevin F Murphy
*Assistant Examiner* — Jonathan J Waddy
(74) *Attorney, Agent, or Firm* — Hartman & Citrin LLC

(57) ABSTRACT

Concepts and technologies are disclosed herein for controllably opening water supply line doors. The controllably opening water supply line door can include a base that includes a first substantially planar piece of material; a door that can include a second substantially planar piece of material; and a hinge structure that can be joined to the base and the door. The hinge structure can include a hinge. The door can be configured to rotate about an axis formed by the hinge to create a passageway.

20 Claims, 7 Drawing Sheets

(56) References Cited

U.S. PATENT DOCUMENTS

| | | | | |
|---|---|---|---|---|
| 6,287,051 | B1* | 9/2001 | Wood | E02B 7/54 |
| | | | | 251/193 |
| 8,695,628 | B2* | 4/2014 | Komatsu | E03F 9/007 |
| | | | | 137/423 |
| 10,180,022 | B1* | 1/2019 | Garg | E05D 3/02 |
| 2004/0217317 | A1* | 11/2004 | Bunn | F16K 1/2007 |
| | | | | 251/301 |
| 2010/0101677 | A1* | 4/2010 | Liebel | F16L 59/161 |
| | | | | 138/158 |
| 2013/0209173 | A1* | 8/2013 | Quek | E05F 15/53 |
| | | | | 405/87 |
| 2014/0191145 | A1* | 7/2014 | Aughton | F16K 1/2007 |
| | | | | 251/213 |
| 2015/0191884 | A1* | 7/2015 | Aughton | E02B 8/04 |
| | | | | 405/99 |

* cited by examiner

CONTROLLABLY OPENING WATER SUPPLY LINE DOORS

CROSS-REFERENCE TO RELATED APPLICATIONS

This application claims the benefit of U.S. Provisional Patent Application No. 62/716,484, entitled "Controllably Opening Water Supply Line Doors," filed Aug. 9, 2018, which is incorporated herein by reference in its entirety.

TECHNICAL FIELD

The present disclosure relates generally to water supply lines and, more particularly, to controllably opening water supply line doors.

BACKGROUND

Unless otherwise indicated herein, all disclosures in the background are not prior art to the claims in this application and are not admitted to be prior art by inclusion in this section.

Frazil ice is a phrase that can be used to refer to a collection of ice crystals that can form in cold moving liquids such as water. In particular, frazil ice can include randomly oriented ice crystals of various sizes and/or shapes that due to various environmental conditions can float or sink in water. Frazil ice can create challenges for entities that rely on water supply lines such as, for example, water treatment plants, nuclear power plants, chemical plants, hydropower plants, or other entities, as well as posing challenges for boats or other vessels.

Frazil ice formation is a phenomenon that generally occurs in super-cooled water exposed to movements such as wind, turbulence, currents, or the like, for example water found in some lakes and rivers. Generally speaking, frazil ice can be formed when ambient temperatures around the water are less than approximately negative six degrees Celsius. The cold ambient temperature can cool the surface of the water below freezing temperature.

The super-cooled water (below freezing temperature) can be mixed into other water by currents, winds, turbulence, or the like. The super-cooled water therefore can result, upon mixing with other water, in the formation of ice crystals below the surface. Due to various phenomena, the ice crystals formed in this manner may have a higher density than regular ice and therefore may not float to the surface of the body of water. Thus, in addition to frazil ice affecting structures at the surface of the water, the ice crystals that do not float to the surface also can block water supply lines or other structures below the surface of the water. For some entities such as nuclear power plants, water treatment plants, or the like, a blockage of a water supply line at or below the surface of the water by frazil ice (or other causes) can require a cessation of operations.

SUMMARY

It should be appreciated that this summary is provided to introduce a selection of concepts associated with the concepts and technologies disclosed herein in a simplified form. The concepts discussed in this summary are further described below in the detailed description. This summary does not limit the scope of the claimed subject matter and/or the disclosure thereof in the detailed description and drawings in any way.

A facility such as a power plant, production facility, or the like can have a water supply line. A controllably opening water supply line door can be attached to the water supply line and/or a riser. A first end of the pneumatic cylinder or other actuation mechanism can be attached to an interior surface of the water supply line and/or a riser using one or more connection mechanisms. A second end of the pneumatic cylinder or other actuation mechanism can be attached to an interior surface of the controllably opening water supply line door using one or more connection mechanisms. An air supply line, an electrical line, or another supply line that can provide power, pressure, or the like to the actuating mechanism can be provided for the pneumatic cylinder or other actuating mechanism.

When the controllably opening water supply line door is to be opened, a valve or other mechanism on the air supply line can be actuated, thereby pressurizing the air supply line and, in turn, the pneumatic cylinder. If a motor is used, electrical power can be provided to the motor and the motor can actuate the door. Via pressurization of the pneumatic cylinder (or other actuation of the actuation mechanism), the door of the controllably opening water supply line door can be opened, thereby allowing water to enter the water supply line and/or the riser. Thus, embodiments of the concepts and technologies disclosed herein can enable opening of the water supply line and/or the riser even if surrounded by frazil ice. It should be understood that this example is illustrative, and therefore should not be construed as being limiting in any way.

According to one aspect of the embodiments disclosed herein, a controllably opening water supply line door is disclosed. The controllably opening water supply line door can include a base that can include a first substantially planar piece of material; a door that can include a second substantially planar piece of material; and a hinge structure that can be joined to the base and the door. The hinge structure can include a hinge, and the door can be configured to rotate about an axis formed by the hinge to create a passageway.

In some embodiments, at least one of the base, the door, or the hinge can be formed from steel or aluminum. In some embodiments, a first surface of the door can be configured to engage the base and to face an interior of a water supply line. In some embodiments, the base can be formed as a circular piece of material and the base further can include radially aligned base connection mechanisms. In some embodiments, at least one of the radially aligned base connection mechanisms can include a through hole or other aperture. As used herein, a "through hole" comprises an aperture that passes through a structure (e.g., a base). In some embodiments, the through hole can create a passageway for a bolt, rivet, or other connection mechanisms. The controllable opening supply line door can be configured for connection to a water supply line via a connection mechanism that can be passed through the through hole and into a support surface of the water supply line.

In some embodiments, the controllably opening water supply line door can further include a bracket that can be attached to, connected to, formed on, and/or otherwise located at a first surface of the door. The door can include a second surface. The second surface can be configured to face a body of water and the first surface can be configured to face an interior of a water supply line. In some embodiments, the bracket can be configured to engage an actuating mechanism that can be configured to open and close the controllably opening water supply line door. In some embodiments, the actuation mechanism can include a pneumatic cylinder. A first end of the pneumatic cylinder can be attached to the bracket and a second end of the pneumatic cylinder can be attached to an interior surface of the water supply line.

In some embodiments, the base can be formed as a circular piece of material. The base further can include radially aligned base connection mechanisms and the door can include at least two radially aligned door connection mechanisms. In some embodiments, the controllably opening water supply line door can be sealed by a single bolt that passes through at least one of the base connection mechanisms, at least one of the door connection mechanisms, and that engages the water supply line.

According to another aspect of the embodiments disclosed herein, a controllably opening water supply line door is disclosed. The controllably opening water supply line door can include a base, a door, and a hinge structure. The base can include a first substantially planar and substantially circular piece of material. The base further can include two or more radially aligned base connection mechanisms. The door can include a second substantially planar piece of material. The door can include at least two radially aligned door connection mechanisms. The hinge structure can be joined to the base and the door. The hinge structure can include a hinge. The door can be configured to rotate about an axis formed by the hinge to create a passageway into a water supply line, and the door can be configured to be controllably opened remotely.

In some embodiments, at least one of the radially aligned base connection mechanisms can include a through hole. The controllable opening supply line door can be configured for connection to a water supply line via a connection mechanism that can be passed through the through hole and into a support surface of the water supply line. In some embodiments, the controllably opening water supply line door can include a bracket that can be attached to a first surface of the door. The door can include a second surface. The second surface can be configured to face a body of water and the first surface can be configured to face an interior of a water supply line.

In some embodiments, the bracket can be configured to engage an actuating mechanism that can be configured to open and close the controllably opening water supply line door. In some embodiments, the actuation mechanism can include a pneumatic cylinder. A first end of the pneumatic cylinder can be attached to the bracket and a second end of the pneumatic cylinder can be attached to an interior surface of the water supply line. In some embodiments, the controllably opening water supply line door can be configured to be sealed by a single bolt that passes through at least one of the base connection mechanisms, at least one of the door connection mechanisms, and that engages the water supply line.

According to yet another aspect of the embodiments disclosed herein, a water supply line riser and saddle is disclosed. The water supply line riser and saddle can include a saddle that can be configured to engage an outer surface of a water supply line; a riser that can be joined to the saddle; and a controllably opening water supply line door that can be attached to the riser, wherein the controllably opening water supply line can include a base, a door, and a hinge structure. The door can include a first substantially planar and substantially circular piece of material. The base further can include two or more radially aligned base connection mechanisms. The door can include a second substantially planar piece of material. The door can include at least two radially aligned door connection mechanisms. The hinge structure can be joined to the base and the door. The hinge structure can include a hinge. The door can be configured to rotate about an axis formed by the hinge to create a passageway into the riser and the door can be configured to be controllably opened remotely.

In some embodiments, the door further can include a bracket that can be attached to a first surface of the door. The door can include a second surface. The second surface can be configured to face a body of water and the first surface can be configured to face an interior of the riser. In some embodiments, the bracket can be configured to engage an actuating mechanism that can be configured to open and close the controllably opening water supply line door. In some embodiments, the actuating mechanism can include a pneumatic cylinder. A first end of the pneumatic cylinder can be attached to the bracket and a second end of the pneumatic cylinder can be attached to an interior surface of the water supply line.

The features, functions, and advantages discussed herein can be achieved independently in various embodiments of the concepts and technologies disclosed herein, or may be combined in yet other embodiments, further details of which can be seen with reference to the following description and drawings. As noted above, the foregoing summary is illustrative only and is not limiting in any way. In addition to the illustrative aspects, embodiments, and features described above, further aspects, embodiments, and features will become apparent by reference to the drawings and the following detailed description.

DETAILED DESCRIPTION

Figure 1:
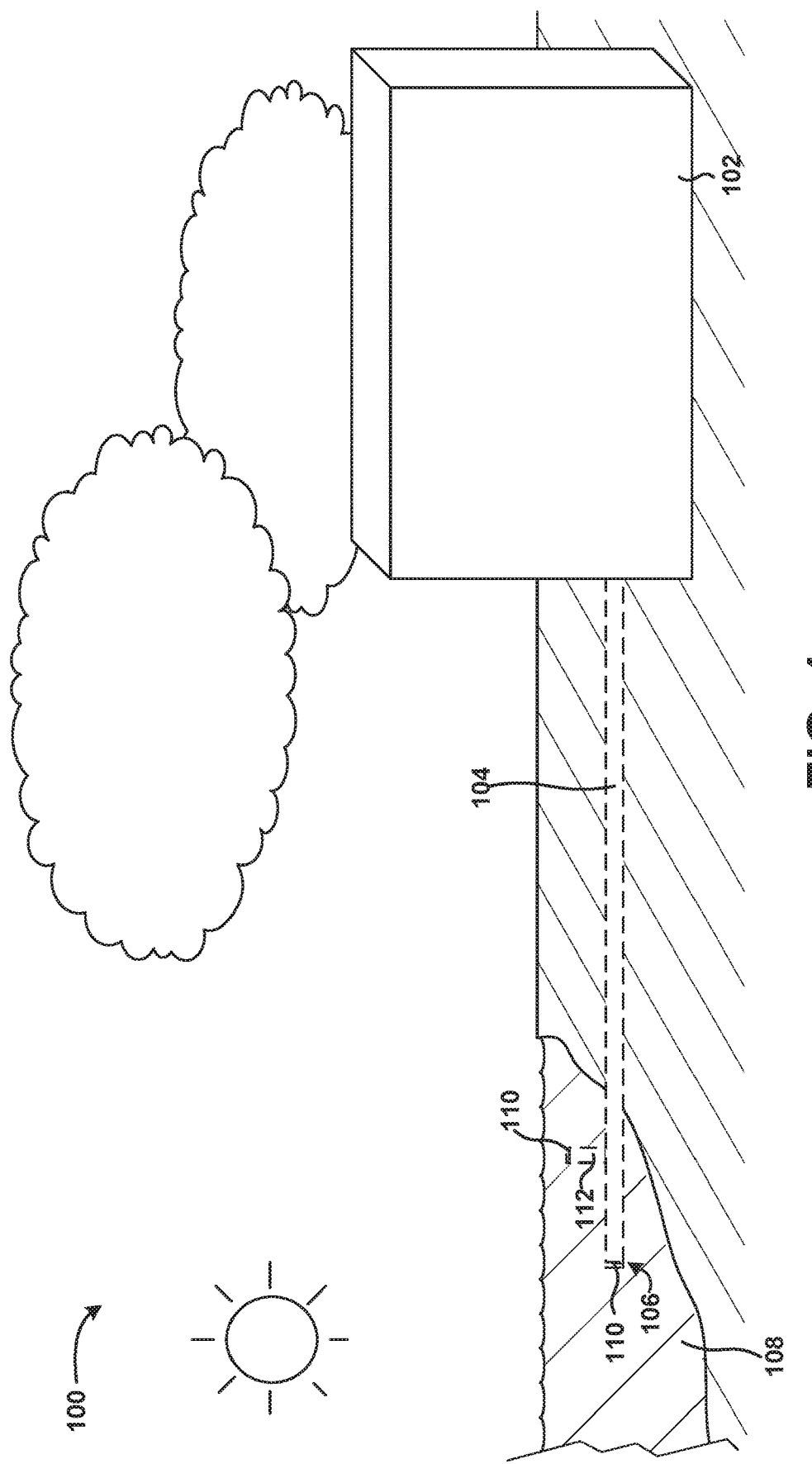
FIG. 1 is a line drawing showing aspects of an operating environment for a controllably opening water supply line door, according to some illustrative embodiments of the concepts and technologies disclosed herein.

The following detailed description is directed to controllably opening water supply line doors. A facility such as a power plant, production facility, or the like can have a water supply line. A controllably opening water supply line door can be attached to the water supply line and/or a riser. A first end of the pneumatic cylinder or other actuation mechanism can be attached to an interior surface of the water supply line and/or a riser using one or more connection mechanisms. A second end of the pneumatic cylinder or other actuation mechanism can be attached to an interior surface of the controllably opening water supply line door using one or more connection mechanisms. An air supply line, an electrical line, or another supply line that can provide power, pressure, or the like to the actuating mechanism can be provided for the pneumatic cylinder or other actuating mechanism.

When the controllably opening water supply line door is to be opened, a valve or other mechanism on the air supply line can be actuated, thereby pressurizing the air supply line and, in turn, the pneumatic cylinder. If a motor is used, electrical power can be provided to the motor and the motor can actuate the door. Via pressurization of the pneumatic cylinder (or other actuation of the actuation mechanism), the door of the controllably opening water supply line door can be opened, thereby allowing water to enter the water supply line and/or the riser. Thus, embodiments of the concepts and technologies disclosed herein can enable opening of the water supply line and/or the riser even if surrounded by frazil ice. It should be understood that this example is illustrative, and therefore should not be construed as being limiting in any way. Because air is used in some embodiments, cold water environments of the controllably opening water supply line door may not affect the operation of the controllably opening water supply line door. These and other advantages and features will become apparent from the description of the various embodiments below.

In the following detailed description, references are made to the accompanying drawings that form a part hereof and that show, by way of illustration, specific embodiments or examples. It must be understood that the disclosed embodiments are merely illustrative of the concepts and technologies disclosed herein. The concepts and technologies disclosed herein may be embodied in various and alternative forms, and/or in various combinations of the embodiments disclosed herein. The word "illustrative," as used in the specification, is used expansively to refer to embodiments that serve as an illustration, specimen, model or pattern.

Additionally, it should be understood that the drawings are not necessarily to scale, and that some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure. Referring now to the drawings, in which like numerals represent like elements throughout the several figures, aspects of controllably opening water supply line doors will be described.

Referring now to FIG. 1, aspects of an operating environment 100 for various embodiments of the concepts and technologies disclosed herein for a controllably opening water supply line door will be described, according to an illustrative embodiment. The operating environment 100 shown in FIG. 1 is illustrated as including a plant, factory, or other entity (hereinafter referred to as a "plant") 102. The plant 102 includes or accesses a water supply line 104. The water supply line 104 can include a water supply line end 106 that extends into a body of water 108. It should be understood that this example is illustrative, and therefore should not be construed as being limiting in any way.

According to various embodiments of the concepts and technologies disclosed herein, the plant 102 can include any structure, entity, or device that uses water from the body of water 108, where the water from the body of water 108 arrives at the plant 102 via the water supply line 104. According to various embodiments, the plant 102 can include, but is not limited to, a nuclear power plant, a water treatment plant, a power plant, a chemical plant, a production facility, and/or any other type of structure, entity, device, or the like that uses water from the body of water 108 or similar bodies of water.

The body of water 108 can include, in some embodiments, a natural body of water such as a lake, a river, a reservoir, or the like. Thus, it can be appreciated that the body of water 108 can be natural and/or manmade. In various embodiments, the body of water 108 can exist in an environment that can, at least part of the year, have an ambient temperature that is significantly (e.g., at least six degrees Celsius) below the freezing temperature of water (e.g., negative six degrees Celsius or colder). Also, the body of water 108 can be exposed to turbulence, currents, winds, and/or other external forces that may encourage the super-cooled water at the surface of the body of water 108 to mix with water below the surface of the water. As a result of the super-cooled water mixing with cold water below the surface, the water below the surface also may freeze, which can result in the formation of frazil ice.

Frazil ice can build up at the surface of the body of water 108 and/or below the surface of the body of water 108. Thus, in some embodiments, the water supply line 104 can be partially or completely blocked by frazil ice, thereby restricting and/or blocking the flow of water from the body of water 108 into the plant 102. Such restriction of the flow of water from the body of water 108 can result in the plant 102 not being able to function normally (or even at all) due to a total or partial lack of water. Embodiments of the concepts and technologies disclosed herein are directed to enabling water to flow freely from the body of water 108 into the water supply line 104.

In particular, because the buildup of frazil ice at the water supply line end 106 of the water supply line 104 can prevent or restrict the flow of water into the water supply line end 106, embodiments of the concepts and technologies disclosed herein can include structures for enabling water flow into the water supply line 104 notwithstanding the presence of frazil ice. In particular, various embodiments of the concepts and technologies disclosed herein can include a controllably opening water supply line door 110. Some other embodiments of the concepts and technologies disclosed herein can include a water supply line riser and saddle 112. The water supply line riser and saddle 112 can also include, in some embodiments, a controllably opening water supply line door 110. Various aspects of the controllably opening water supply line door 110 and the water supply line riser and saddle 112 will be illustrated and described in more detail below. It should be understood that in some embodiments, the water supply line riser and saddle 112 can be replaced with a riser and the controllably opening water supply line door 110 can be located on that riser in addition to, or instead of, being located on the water supply line riser and saddle 112.

Furthermore, it should be understood that the riser and/or that the water supply line riser and saddle 112 can be located at any location along the water supply line 104 including, but not limited to, the relative position shown in FIG. 1. In some embodiments, the water supply line 104 can have an open end at the water supply line end 106 and the riser and/or the water supply line riser and saddle 112 can be located elsewhere along the water supply line 104. It should be understood that this example is illustrative, and therefore should not be construed as being limiting in any way.

Also, it should be understood that the depth of the riser and/or the water supply line riser and saddle 112 (and the water supply line 104 for that matter) can be varied according to any number of considerations (e.g., water levels, winds, currents, propensity to freeze and/or propensity for formation of frazil ice, water temperatures, air temperatures, combinations thereof, or the like). In some embodiments, the top of the riser and/or the water supply line riser and saddle 112 can be located at a depth of about six to about twelve feet (and preferably, in some embodiments, about eight to ten feet) below the surface of the body of water 108. Of course, because this depth can be varied for any number of reasons, this embodiment is illustrative and should not be construed as being limiting in any way. It also must be appreciated that the diameter of the water supply line 104, the riser, the water supply line riser and saddle 112, and/or the controllably opening water supply line door 110 can be varied.

Briefly, the controllably opening water supply line door 110 can be controlled remotely to forcefully open the water supply line end 106 even if surrounded by frazil ice. The controllably opening water supply line door 110 can be attached to the water supply line 104 to provide the functionality illustrated and described herein for controllably opening the water supply line 104. The water supply line riser and saddle 112 can be used in some embodiments to retrofit a water supply line 104 with the controllably opening water supply line door 110. Namely, the water supply line riser and saddle 112 can be attached to an existing water supply line 104 to create a riser, where the riser can include an embodiment of the controllably opening water supply line door 110. Thus, embodiments of the concepts and technologies disclosed herein can enable the controllably opening water supply line door 110 to be added to a new and/or existing water supply line 104. It should be understood that this example is illustrative, and therefore should not be construed as being limiting in any way.

FIG. 1 illustrates one plant 102, one water supply line 104, one body of water 108, two controllably opening water supply line doors 110, and one water supply line riser and saddle 112. It should be understood, however, that various implementations of the operating environment 100 can include one, two, or more than two plants 102; one, two, or more than two water supply lines 104; one, two, or more than two bodies of water 108; one, two, or more than two controllably opening water supply line doors 110; and/or zero, one, or more than one water supply line riser and saddles 112. As such, the illustrated embodiment of the operating environment 100 shown in FIG. 1 should be understood as being illustrative, and should not be construed as being limiting in any way.

Figure 2:
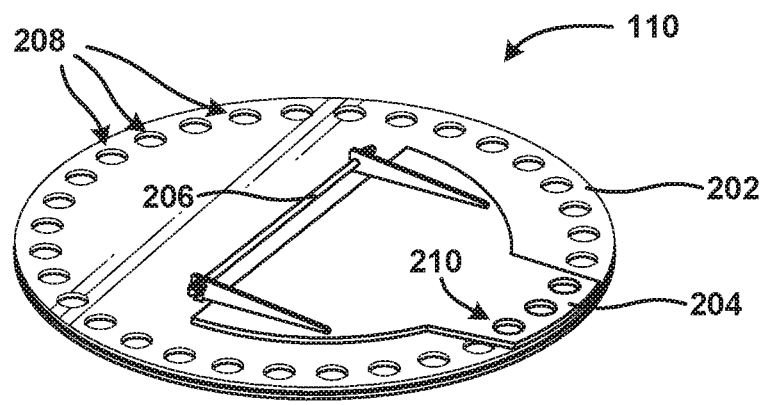
FIG. 2 is a line drawing showing aspects of a controllably opening water supply line door, according to some illustrative embodiments of the concepts and technologies disclosed herein.

Referring now to FIG. 2, various aspects of the controllably opening water supply line door 110 will be described in detail, according to some illustrative embodiments of the concepts and technologies disclosed herein. In particular, FIG. 2 is a line drawing showing the controllably opening water supply line door 110 according to one illustrative embodiment. It should be understood that the example embodiment shown in FIG. 2 is illustrative and should not be construed as being limiting in any way.

As shown in FIG. 2, the controllably opening water supply line door 110 can include a base 202 and a door 204, which can be connected to the base 202. According to various embodiments, the base 202 can include a substantially planar piece of material such as, for example, steel. In some embodiments, stainless steel may be used to prevent corrosion of the base 202, though other materials such as brass, copper, aluminum, zinc, and/or other metals, alloys, and the like are contemplated and are possible. In some embodiments, the base 202 can be formed as a substantially planar and substantially round plate of material. It should be understood that this example is illustrative, and therefore should not be construed as being limiting in any way. According to various embodiments, the door 204 can include a substantially planar piece of material such as, for example, steel. In some embodiments, stainless steel may be used to prevent corrosion of the door 204, though other materials such as brass, aluminum, zinc, copper, and/or other metals, alloys, and the like are contemplated and are possible. It should be understood that this example is illustrative, and therefore should not be construed as being limiting in any way.

In various embodiments of the concepts and technologies disclosed herein, the door 204 can be rotatably connected to the base 202 via a structure such as a hinge structure 206. The hinge structure 206 can be connected to the base 202 and the door 204 via one or more welds, mechanical connection mechanisms and/or structures, or other connection technologies. In the illustrated embodiment, a first portion of the hinge structure 206 can be welded to the base 202 and a second portion of the hinge structure 206 can be welded to the door 204. It should be understood that this example is illustrative, and therefore should not be construed as being limiting in any way.

It should be understood that the base 202, the door 204, and/or the hinge structure 206 can be formed from any suitable materials and can include coatings and/or treatments such as galvanization, oxide layers, anodization, or the like to prevent and/or inhibit corrosion of these and/or other structures of the controllably opening water supply line door 110. The hinge structure 206 can include a hinge or structure that can provide a rotational axis about which the door 204 can controllably rotate to open the controllably opening water supply line door 110. It should be understood that the hinge structure 206 is illustrated according to one contemplated embodiment of the concepts and technologies disclosed herein and therefore should not be construed as being limiting in any way.

According to various embodiments, as will be illustrated and described in more detail hereinbelow, the door 204 can be rotated about the hinge structure 206 by a pushing force exerted onto the door 204 and/or by a pulling force exerted onto the door 204. In various embodiments of the concepts and technologies disclosed herein, the base 202 of the controllably opening water supply line door 110 can include base connection structures or mechanisms (hereinafter "base connection structures") 208. In the illustrated embodiment, the base connection structures 208 can include apertures, through holes, or the like, which can be formed through the base 202, via which bolts or other connection mechanisms (not shown in FIG. 2) can be located. The connection mechanisms can be configured to pass through or to engage the base 202, and can be configured to engage a support surface of the water supply line 104, thereby attaching the controllably opening water supply line door 110 to the water supply line 104. In some embodiments, the connection mechanisms can pass into a radial thickness of the water supply line 104, as can be appreciated with reference to the figures. It should be understood that this example is illustrative, and therefore should not be construed as being limiting in any way.

Although the base connection structures 208 are illustrated and described herein as through holes, it can be appreciated that many other structures can be used to attach the controllably opening water supply line door 110 to the water supply line 104 and therefore, the illustrated embodiment should not be construed as being limiting in any way.

The door 204 also can include one or more door connection structures or mechanisms ("door connection structures") 210. In the illustrated embodiment, the door connection structures 210 can include apertures, through holes, or the like, which can be formed through the door 204, via which bolts or other connection mechanisms (not shown in FIG. 2) can be located. It can be appreciated with reference to FIGS. 2-3 that the door connection structures 210 and at least one of the base connection structures 208 can be aligned, in some embodiments. This arrangement can enable sealing of the door 204 and/or the entire controllably opening water supply line door 110, if desired. It should be understood that this example is illustrative, and therefore should not be construed as being limiting in any way.

Figure 3:
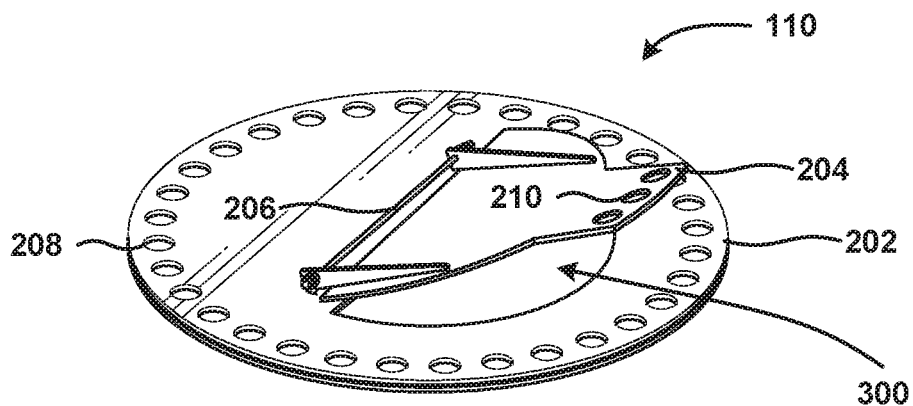
FIG. 3 is a line drawing showing aspects of a controllably opening water supply line door, according to an illustrative embodiment of the concepts and technologies disclosed herein.

As shown in FIG. 3, the door 204 can be opened to create an opening 300 via which water and/or other materials can flow into the water supply line 104. According to various embodiments of the concepts and technologies disclosed herein, the door 204 can be opened by a pneumatic cylinder (not visible in FIG. 3), a motor, and/or other structures and/or devices. In some embodiments, a pneumatic cylinder may be used because the cold temperatures in which the controllably opening water supply line door 110 operates may not substantially affect the operation of a pneumatic cylinder and/or other pneumatic device. It should be understood that this example is illustrative, and therefore should not be construed as being limiting in any way.

It must be understood that relative dimensions of the controllably opening water supply line door 110 can be varied. Thus, for example, it must be understood that the shape, features, and/or diameter of the controllably opening water supply line door 110 and/or the base 202 can be varied; that the shape, size, and/or location of the door 204 can be varied; that a relative sizes of the door 204 and/or features thereof (relative to the base 202 and/or other entities) can be varied; that the shape of, location of, and/or size (in absolute or relative to other components of the controllably opening water supply line door 110) of the hinge structure 206 can be varied; that the number of, shape of, and/or size (in absolute or relative to other components of the controllably opening water supply line door 110) of the base connection structures 208 can be varied; that the number of, shape of, and/or size (in absolute or relative to other components of the controllably opening water supply line door 110) of the door connection structures 210 can be varied; and/or that other aspects, components, and/or relationships among and/or between structures and/or components of the controllably opening water supply line door 110 can be varied. As such, the illustrated embodiments of the controllably opening water supply line door 110 shown in FIGS. 3-4 and/or other FIGURES should be understood as being illustrative and should not be construed as being limiting in any way.

Figure 4:
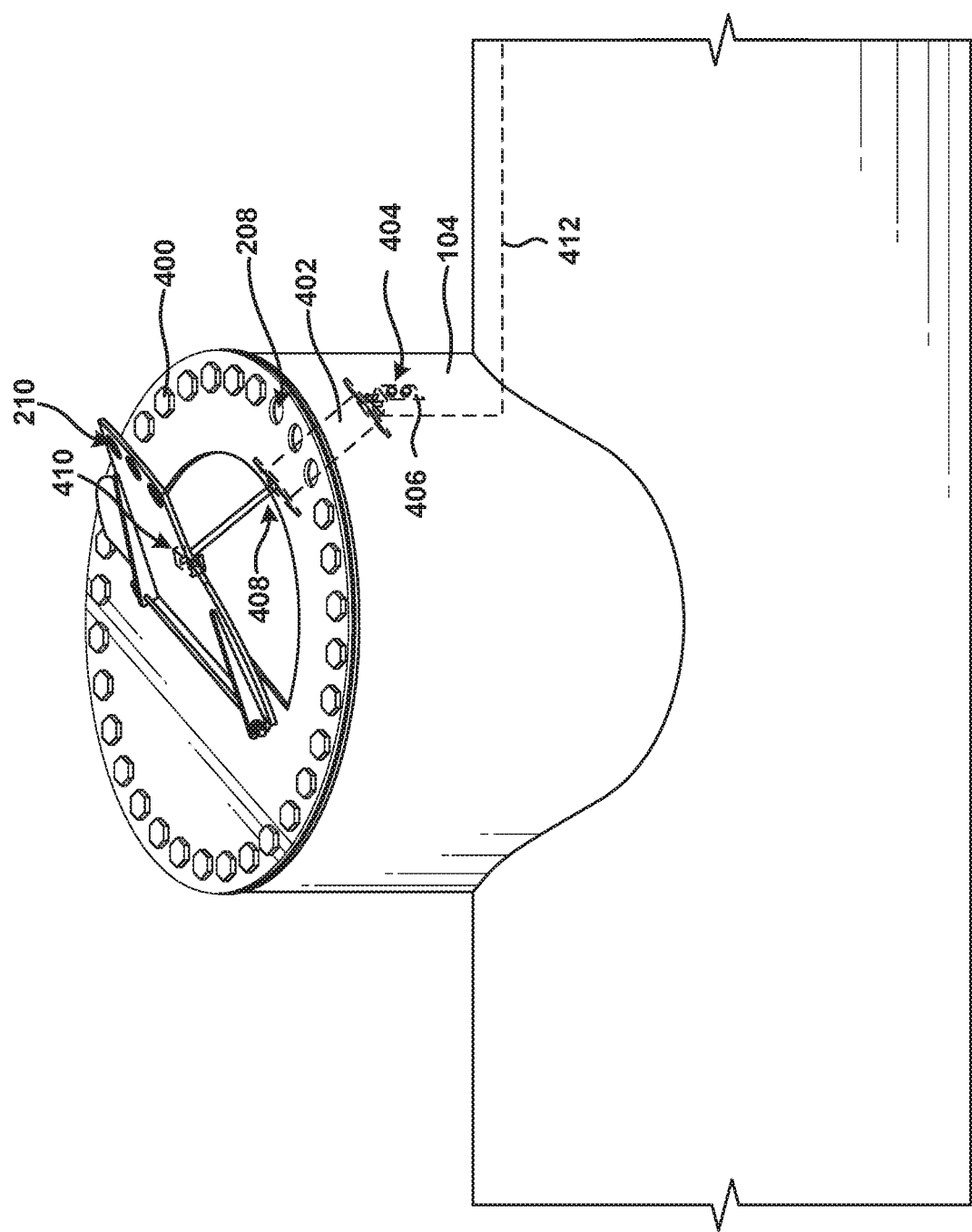
FIG. 4 is a line drawing showing aspects of a controllably opening water supply line door, according to some illustrative embodiments of the concepts and technologies disclosed herein.

Referring now to FIG. 4, additional aspects of the controllably opening water supply line door 110 will be described in detail. As shown in FIG. 4, the controllably opening water supply line door 110 can be attached to the water supply line 104 and/or to a riser of a water supply line riser and saddle 112. In some embodiments, the controllably opening water supply line door 110 can be connected, attached, or otherwise located at the water supply line 104 and/or the riser of the water supply line riser and saddle 112 by one or more connection mechanisms such as, for example, bolts, welds, or the like ("bolts") 400. It can be appreciated that the riser of a water supply line riser and saddle 112 can be substantially similar to a water supply line 104. As such, it must be understood that the riser of the water supply line riser and saddle 112 and the water supply line 104 can be interchangeable according to various embodiments of the concepts and technologies disclosed herein.

As shown in FIG. 4, an actuation mechanism such as a pneumatic cylinder (hereinafter referred to as a pneumatic cylinder) 402 can be used to open the door of the controllably opening water supply line door 110. For purposes of describing various embodiments of the concepts and technologies disclosed herein, the example of a pneumatic cylinder 402 will be used, but it can be appreciated from the above description that this embodiment is illustrative and therefore should not be construed as being limiting in any way.

As shown in FIG. 4, a first end 404 of the pneumatic cylinder 402 can be mounted or otherwise connected or attached to an interior surface of the water supply line 104 and/or to an interior surface of the riser of the water supply line riser and saddle 112. As shown in FIG. 4, the first end 404 of the pneumatic cylinder 402 can include a mounting bracket or other structures ("mounting bracket") 406 that can be bolted or otherwise connected or attached to the water supply line 104 and/or to a riser of a water supply line riser and saddle 112. Because the pneumatic cylinder 402 can be attached, connected, and/or otherwise located at or near the water supply line 104 and/or to a riser of a water supply line riser and saddle 112 in a variety of other manners, it should be understood that this example is illustrative, and therefore should not be construed as being limiting in any way.

In the illustrated embodiment, a second end 408 of the pneumatic cylinder 402 can be attached to the door 204 of the controllably opening water supply line door 110. In some embodiments, as shown in FIG. 4, the second end 408 of the pneumatic cylinder 402 can be attached to a bracket 410 or other connection mechanism that can be located, in some embodiments, on an interior side of the door 204 (e.g., on the side of the door that is closest to the interior of the water supply line 104 and/or the riser of the water supply line riser and saddle 112. It can be appreciated that the pneumatic cylinder 402 and/or other actuation mechanisms can be attached, connected to, and/or otherwise interface with the various structures of the controllably opening water supply line door 110 and, as such, the illustrated embodiment is illustrative and should not be construed as being limiting in any way.

In operation, the controllably opening water supply line door 110 can be attached to the water supply line 104 and/or the riser of the water supply line riser and saddle 112 by one or more bolts 400. The first end 404 of the pneumatic cylinder 402 or other actuation mechanism can be attached to an interior surface of the water supply line 104 and/or the riser of the water supply line riser and saddle 112 using bolts or other connection mechanisms. The second end 408 of the pneumatic cylinder 402 or other actuation mechanism can be attached to an interior surface of the controllably opening water supply line door 110 using bolts or other connection mechanisms. An air supply line 412, an electrical line, or another supply line that can provide power, pressure, or the like to the actuating mechanism can be run to the pneumatic cylinder 402 or other actuating mechanism. In the illustrated embodiment, the pneumatic cylinder 402 can be charged via air pressure provided via the air supply line 412. It should be understood that this example is illustrative, and therefore should not be construed as being limiting in any way.

When the controllably opening water supply line door 110 is to be opened, a valve or other mechanism on the air supply line 412 can be actuated, thereby pressurizing the air supply line 412 and, in turn, the pneumatic cylinder 402. Via pressurization of the pneumatic cylinder 402, the door 204 of the controllably opening water supply line door 110 can be opened, thereby allowing water to enter the water supply line 104 and/or to a riser of a water supply line riser and saddle 112. It should be understood that this example is illustrative, and therefore should not be construed as being limiting in any way.

As can be seen in FIG. 4, three of the door connection structures 210 and three of the base connection structures 208 can be aligned, in some embodiments. This arrangement can enable sealing of the door 204 and/or the entire controllably opening water supply line door 110, if desired. In some embodiments, such as the embodiment shown in FIG. 4, the three base connection structures 208 that align with the door connection structures 210 can be left open. It should be understood that this example is illustrative, and therefore should not be construed as being limiting in any way.

It must be understood that the number, shape, location, and/or relative dimensions of various components of the controllably opening water supply line door 110 (e.g., the base 202, the door 204, the hinge structure 206, the base connection structures 208, and/or the door connection structures 210) can be varied. Also, while FIG. 4 illustrates an existing riser, it can be appreciated that features of the controllably opening water supply line door 110 shown in FIG. 4 can be used in association with the water supply line riser and saddle 112 illustrated and described herein as well. Also, it should be understood that the height of the riser can be varied. Thus, it should be understood that the illustrated embodiment is illustrative, and therefore should not be construed as being limiting in any way.

Figure 5:
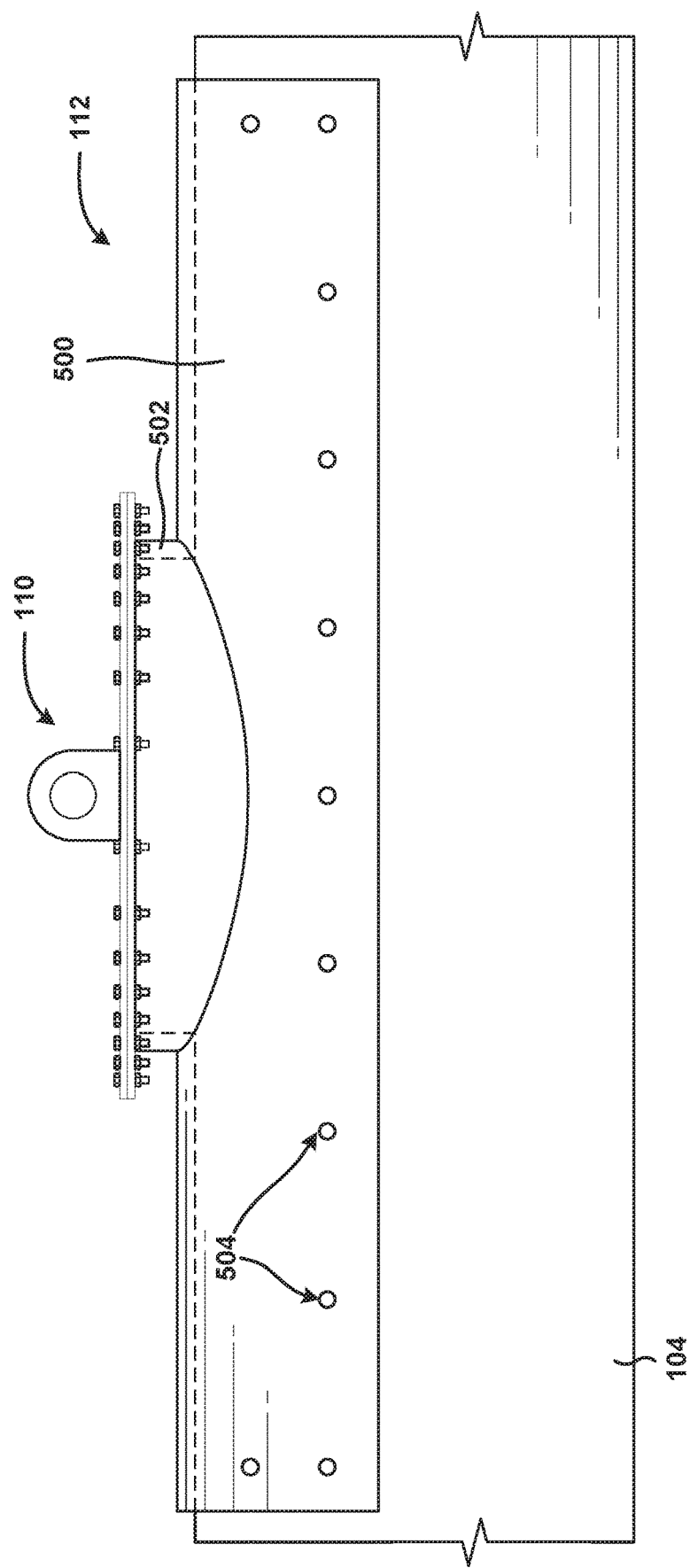
FIG. 5 is a line drawing showing aspects of a water supply line riser and saddle, according to some illustrative embodiments of the concepts and technologies disclosed herein.

Turning now to FIG. 5, additional aspects of the controllably opening water supply line door 110 will be described in detail. As shown in FIG. 5, the water supply line riser and saddle 112 is illustrated according to an illustrative embodiment of the concepts and technologies disclosed herein. As shown in FIG. 5, the water supply line riser and saddle 112 can include a saddle 500 and a riser 502. The saddle 500 can be configured to engage an outer surface of a water supply line 104 or other water line such as a riser or the like. The saddle 500 can include, in various embodiments, one or more saddle connection mechanisms 504 such as, for example, bolts, welds, or the like. Thus, it can be appreciated that the saddle 500 can be connected to, attached to, and/or otherwise located at the outer surface of the water supply line 104 or other water line using, for example, one or more welds, bolts, or other connection mechanisms.

As shown in FIG. 5, the controllably opening water supply line door 110 can be located on top of the riser 502, in some embodiments. Thus, it can be appreciated that the controllably opening water supply line door 110 can be retrofitted to water supply lines 104 by either attaching the controllably opening water supply line door 110 to an end of the water supply line 104 and/or by attaching the water supply line riser and saddle 112 to the water supply line 104 and then attaching the controllably opening water supply line door 110 to the riser of the water supply line riser and saddle 112. Although not visible in FIG. 5, it can be appreciated that the pneumatic cylinder 402 and/or other actuation mechanism can be located within the riser 502 to open and/or close the controllably opening water supply line door 110. It should be understood that these examples are illustrative, and therefore should not be construed as being limiting in any way.

It must be understood that the number, shape, location, and/or relative dimensions of various components of the water supply line riser and saddle 112 (and/or the controllably opening water supply line door 110 connected thereto) can be varied. Thus, for example, the number, shape, location, and/or relative dimensions of various components of the base 202, the door 204, the hinge structure 206, the base connection structures 208, the door connection structures 210, the riser 502, the saddle 500, and the saddle connection mechanisms 504, can be varied. Also, it can be appreciated that some features of the water supply line riser and saddle 112 and/or the controllably opening water supply line door 110 shown in FIG. 5 can be used in association with other water supply lines 104 and/or existing risers. Thus, it should be understood that the illustrated embodiment is illustrative, and therefore should not be construed as being limiting in any way.

Figure 6:
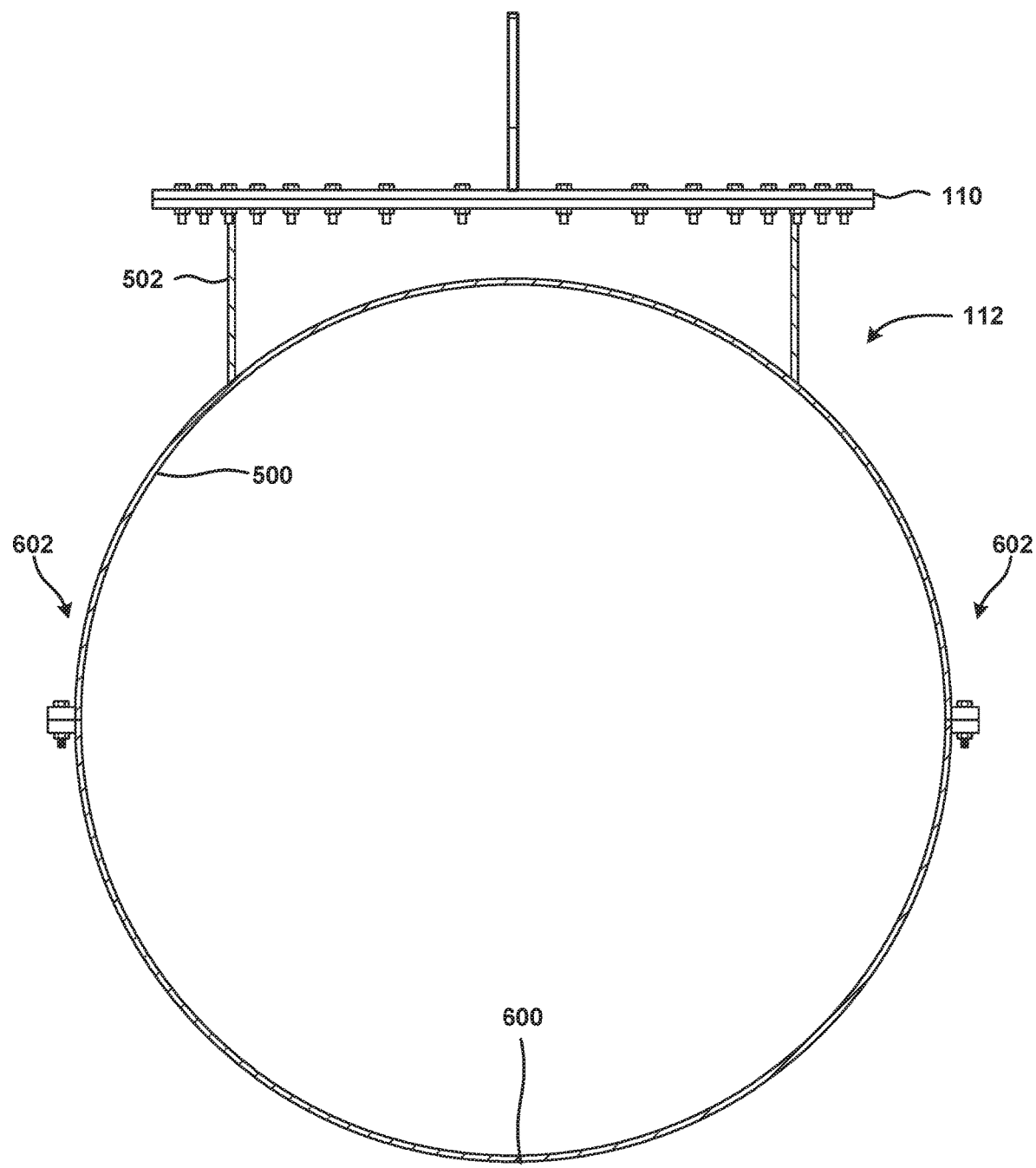
FIG. 6 is a line drawing showing aspects of a water supply line riser and saddle, according to some illustrative embodiments of the concepts and technologies disclosed herein.

Turning now to FIG. 6, additional aspects of the controllably opening water supply line door 110 will be described in detail. As shown in FIG. 6, a connection of the water supply line riser and saddle 112 to the water supply line 104 can be provided by, or can be reinforced by, in some embodiments, one or more u-bolt or similar mechanism ("u-bolt") 600. The u-bolt 600 can be attached to the saddle 500 of the water supply line riser and saddle 112 via u-bolt connection mechanisms 602 (e.g., bolts, rivets, or other connection mechanisms). The u-bolts 600 can hold the water supply line riser and saddle 112 to the water supply line 104 (e.g., the u-bolts 600 can obviate other methods of connecting the water supply line riser and saddle 112 to the water supply line 104) in some embodiments, or can reinforce other connection mechanisms used to connect the water supply line riser and saddle 112 to the water supply line 104 (e.g., the u-bolts 600 can be used to reinforce the saddle connection mechanisms 504 or other mechanisms for connecting the water supply line riser and saddle 112 to the water supply line 104 in some embodiments). Thus, the connection between the water supply line riser and saddle 112 can be reinforced by the u-bolt 600 or the like. It should be understood that this example is illustrative, and therefore should not be construed as being limiting in any way.

According to various embodiments of the concepts and technologies disclosed herein, pneumatic pressure may be used to operate the pneumatic cylinder 402 illustrated and described herein. According to various embodiments, the air supply line 412 used to provide pressurized air to the pneumatic cylinder 402 can be pressurized to at least one hundred twenty five pounds per square inch of air pressure. Other pressures are possible and are contemplated, and as such, it should be understood that this example is illustrative, and therefore should not be construed as being limiting in any way.

According to various embodiments, the water supply line riser and saddle 112 can be bolted or otherwise located at an existing water supply line 104. The height of the riser 502 of the water supply line riser and saddle 112 can vary depending on a depth of the water supply line 104. Thus, the height of the riser 502 can be almost any height and the illustrated embodiment must be understood as being illustrative and should not be construed as being limiting in any way. When installing the water supply line riser and saddle 112, the saddle 500 can be attached to the water supply line 104 (e.g., by bolting the saddle 500 to the water supply line 104 via the saddle connection mechanisms 504 and/or by adding a u-bolt, if desired). After attaching, connecting, or otherwise locating the water supply line riser and saddle 112 at the water supply line 104, an opening for the riser 502 of the water supply line riser and saddle 112 can be cut into the water supply line 104. The size of the opening for the riser 502 can vary depending on intended use, etc.

Figure 7:
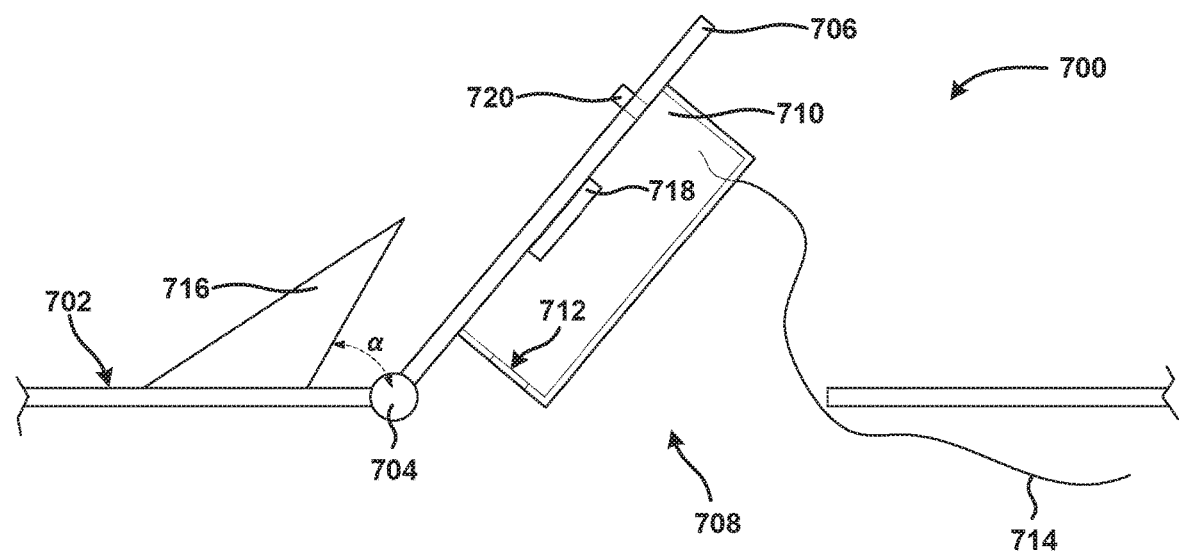
FIG. 7 is a line drawing showing aspects of a controllably opening water supply line door, according to some other illustrative embodiments of the concepts and technologies disclosed herein.

Turning now to FIGS. 7-8, additional aspects of the controllably opening water supply line door 110 will be described in detail. In particular, FIG. 7 illustrates a controllably opening water supply line door 110, according to another illustrative embodiment of the concepts and technologies disclosed herein. As shown in FIG. 7, the controllably opening water supply line door 110 can include a door assembly 700. The door assembly 700 can be located at, near, or on a mounting surface 702. According to various embodiments, the mounting surface 702 can correspond to a surface (e.g., an exterior surface) of a water supply line 104, a water supply line riser and saddle 112, a plate (e.g., a metal plate such as a steel plate) attached to these or other surfaces, combinations thereof, or the like. In some embodiments, the door assembly 700 can be rotatably connected to the mounting surface 702 by a hinge 704 or other structures. It should be understood that this example is illustrative, and therefore should not be construed as being limiting in any way.

The door assembly 700 can include sealing surface 706. The sealing surface 706 can include a substantially planar surface, in some embodiments, or a surface having another shape, if desired. In the illustrated embodiment, the sealing surface 706 can be configured to engage with, and thereby seal, an opening 708 that can be formed in the mounting surface 702. In some embodiments, a gasket or other elements can be included on a surface of the door assembly 700 that engages the mounting surface 702 to provide and/or enhance a seal created by the contact of the door assembly 700 and the mounting surface 702. It should be understood that this example is illustrative, and therefore should not be construed as being limiting in any way.

The door assembly 700 also can include an air chamber 710. The air chamber 710 can be formed by a substantially enclosed void. In some embodiments, the void can be formed by surface projections that can create boundaries for the void, as can be understood with collective reference to FIGS. 7-8. It should be understood that this example is illustrative, and therefore should not be construed as being limiting in any way. As shown in the FIGURES, the air chamber 710 can include a water release port 712. The water release port 712 can be configured to allow air to flow into the air chamber 710, thereby displacing water from the air chamber 710. In some embodiments, the air chamber 710 can be formed as a box that encloses a space, though the shape of the air chamber 710 can be varied (e.g., in FIG. 8A the air chamber 710 is shown as a cylindrically-shaped volume, while in FIG. 8B, the air chamber 710 is shown as a box-shaped volume) for various purposes. It should be understood that this example is illustrative, and therefore should not be construed as being limiting in any way.

As the air chamber 710 is filled, for example with air provided by an air supply line 714, water can be displaced from the void formed in the air chamber 710. The buoyancy created by the filling of the air chamber 710 with air can cause the door assembly 700 of the controllably opening water supply line door 110 to rotate about the hinge 704. In some embodiments, a stop 716 can be included to prevent the door assembly 700 from rotating more than an angle α. The angle α can be set to various angles. In some embodiments, the angle α can be set to sixty degrees. In some other embodiments, the angle α can be set to other angles. In any event, the angle α can be set to prevent the door assembly 700 from rotating more than ninety degrees, which could cause the door assembly to come to rest in the open position. It should be understood that this example is illustrative, and therefore should not be construed as being limiting in any way.

The door assembly 700 also can include a door angle sensor 718. The door angle sensor 718 can be provided by various types of sensors that can determine how many degrees the door assembly 700 has rotated through, an extent to which the controllably opening water supply line door 110 is open, if the door assembly 700 is completely open, if the door assembly 700 is completely closed, combinations thereof, or the like. In some embodiments, the determined angle or extent of opening of the door assembly 700 and/or other components of the controllably opening water supply line door 110 can be communicated wirelessly or via wired media to an output display (e.g., an LED readout), which can present the determined angle or extent to an operator or other entity. It can be appreciated that the readout (of the state of the door assembly 700) can be located on the shore, on a handheld unit, or elsewhere. It should be understood that this example is illustrative, and therefore should not be construed as being limiting in any way.

Figures 8A, 8B:
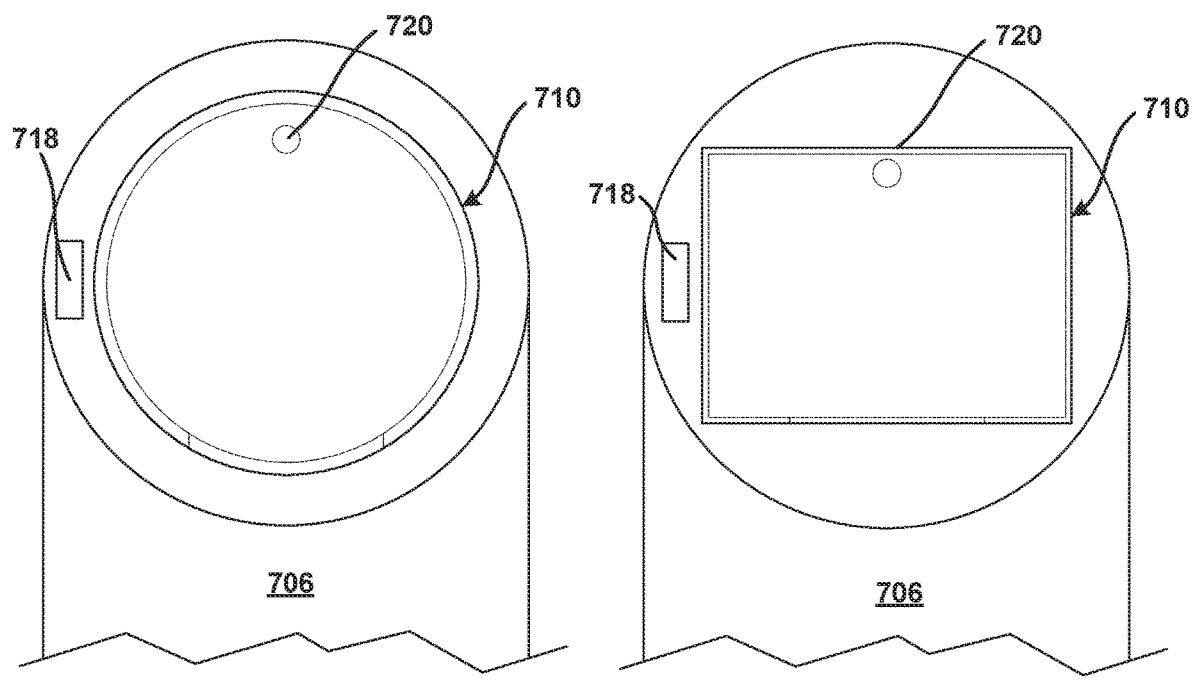
FIGS. 8A-8B are line drawings showing additional aspects of the controllably opening water supply line door, according to some illustrative embodiments of the concepts and technologies disclosed herein.

The door assembly 700 also can include a riser 720. The riser 720 can be configured to vent air from the air chamber 710. Once the door assembly 700 rotates, the frazil ice around the door assembly 700 can thereby be moved away from the controllably opening water supply line door 110. Thus, the air in the air chamber 710 can be vented out of the water release port 712 and/or the riser 720 to allow the door assembly 700 to rotate back into a contact position with the mounting surface 702. It should be understood that these examples are illustrative, and therefore should not be construed as being limiting in any way. FIG. 8A shows a round air chamber 710 (as noted above), but this example is merely illustrative and should not be construed as being limiting in any way. An example of a box-shaped air chamber 710 is shown in FIG. 8B. It should be understood that this example is illustrative, and therefore should not be construed as being limiting in any way.

Figure 9:
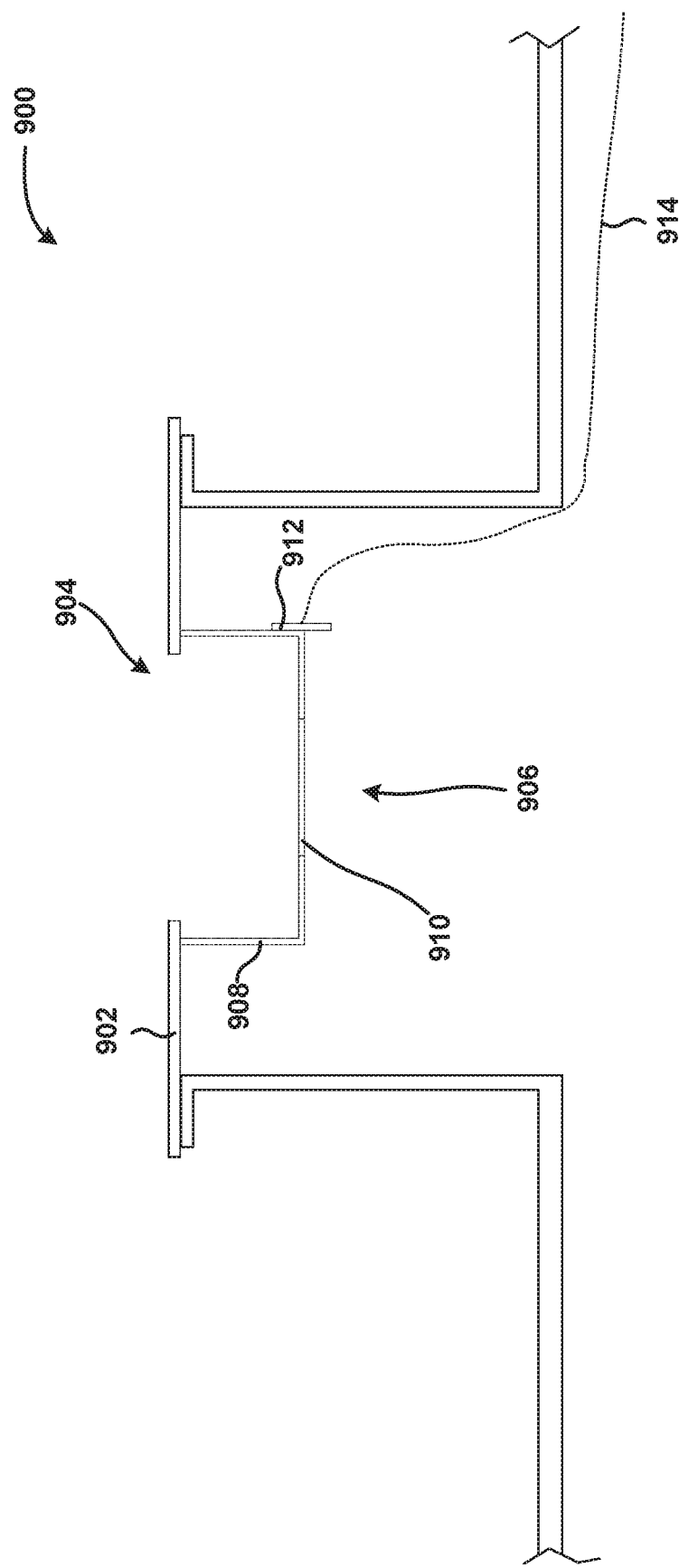
FIG. 9 is a line drawing showing aspects of a controllably opening water supply line door, according to some other illustrative embodiments of the concepts and technologies disclosed herein.

Turning now to FIG. 9, additional aspects of the controllably opening water supply line door 110 will be described in detail. In particular, FIG. 9 illustrates another embodiment of the controllably opening water supply line door 110. In the embodiment shown in FIG. 9, the controllably opening water supply line door 110 includes a butterfly valve assembly 900. The butterfly valve assembly 900 can be bolted under a mounting surface 902. The mounting surface 902 can include, for example, a plate (e.g., a metal plate such as a steel plate) that can be connected to (e.g., bolted to) a surface (e.g., an exterior surface) of a water supply line 104, a water supply line riser and saddle 112, the plate attached to these or other surfaces, combinations thereof, or the like.

The mounting surface 902 can include an aperture or opening ("opening") 904, which can be located in and/or lead into a butterfly valve 906. The butterfly valve 906 can include a body 908, a disk 910 (partially obscured in FIG. 9), a stem or operator ("stem") 912, and other components as generally are known to those of skill in the art. In various embodiments, the rotation of the stem 912 can be controlled pneumatically (e.g., via air pressure delivered by an air supply line 914). In some other embodiments, the stem 912 can be rotated by a motor or other actuator, which can be powered pneumatically, electrically, or the like. Because the controlling of butterfly valves such as the butterfly valve 906 is generally understood, it should be understood that the above embodiments are illustrative and should not be construed as being limiting in any way.

While the above disclosure has addressed various embodiments of the controllably opening water supply line door 110, it should be understood that other embodiments are possible and are contemplated. For example, the use of a pneumatic piston to move the controllably opening water supply line door 110 can be replaced, substituted, and/or complimented with the use of other structures and/or devices to open and/or close one or more components of the controllably opening water supply line door 110. For example, in some embodiments the controllably opening water supply line door 110 can be opened by a worm gear that can be electronically and/or pneumatically controlled. Thus, it must be understood that the air supply line 714 and the air supply line 914 can be replaced and/or complimented by electrical supply lines or other supply lines. Because other structures and/or devices can be used in various embodiments to open the controllably opening water supply line door 110, it should be understood that these examples are illustrative, and therefore should not be construed as being limiting in any way.

Based on the foregoing, it should be appreciated that concepts and technologies for controllably opening water supply line doors are provided herein. Although the subject matter presented herein has been described in language specific to structural features and methodological acts, it is to be understood that the invention defined in the appended claims is not necessarily limited to the specific features or acts described herein. Rather, the specific features and acts are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

The invention claimed is:

1. A controllably opening water supply line door assembly comprising:
- a base comprising a first piece of material configured to engage a water supply line;
- a door comprising a second piece of material having a first surface that is configured to face an interior of the water supply line and a second surface that is configured to face a body of water;
- a bracket located at the first surface of the door;
- an actuating mechanism that is configured to apply a force to the door, via the bracket, to open and close the door; and
- a hinge structure that is joined to the base and the door, wherein the hinge structure comprises a hinge, wherein the door is configured to rotate about an axis formed by the hinge to create a passageway for the water supply line, and wherein the door is configured to allow water to flow into the water supply line from the body of water when the door is opened.

2. The controllably opening water supply line door assembly of claim 1, wherein the base, the door, or the hinge is formed from steel or aluminum.

3. The controllably opening water supply line door assembly of claim 1, wherein the first surface of the door is configured to engage the base.

4. The controllably opening water supply line door assembly of claim 1, wherein the base is formed as a circular piece of material, and wherein the base further comprises at least two base connection mechanisms.

5. The controllably opening water supply line door assembly of claim 4, wherein at least one of the at least two base connection mechanisms comprises a through hole, and wherein a connection mechanism is passed through the through hole and into a support surface of the water supply line.

6. The controllably opening water supply line door assembly of claim 1, wherein the actuating mechanism comprises an electronic device.

7. The controllably opening water supply line door assembly of claim 1, wherein the actuating mechanism comprises a pneumatic device.

8. The controllably opening water supply line door assembly of claim 7, wherein a first end of the pneumatic device is attached to the bracket, and wherein a second end of the pneumatic device is attached to an interior surface of the water supply line.

9. The controllably opening water supply line door assembly of claim 1, wherein the base is formed as a circular piece of material, wherein the base further comprises base connection mechanisms, and wherein the door comprises door connection mechanisms.

10. The controllably opening water supply line door assembly of claim 9, wherein the door is configured to be sealed by a single bolt that passes through at least one of the base connection mechanisms and at least one of the door connection mechanisms, and that engages the water supply line.

11. A controllably opening water supply line door assembly comprising:
- a base comprising a first planar and circular piece of material, wherein the base further comprises a plurality of base connection mechanisms;
- a door comprising a second planar piece of material and having a first surface that is configured to face an interior of a water supply line and a second surface that is configured to face a body of water, wherein the door comprises at least two door connection mechanisms;
- a bracket located at the first surface of the door;
- an actuating mechanism that is configured to apply a force to the door, via the bracket, to open and close the door; and
- a hinge structure that is joined to the base and the door, wherein the hinge structure comprises a hinge, wherein the door is configured to rotate about an axis formed by the hinge to create a passageway into the water supply line, wherein the door is configured to be controllably opened remotely, and wherein the door is configured to allow water to flow into the water supply line from the body of water when the door is opened.

12. The controllably opening water supply line door assembly of claim 11, wherein at least one of the plurality of base connection mechanisms comprises a through hole, and wherein a connection mechanism is passed through the through hole and into a support surface of the water supply line.

13. The controllably opening water supply line door assembly of claim 11, wherein the actuating mechanism comprises an electronic device.

14. The controllably opening water supply line door assembly of claim 11, wherein the actuating mechanism comprises a pneumatic device.

15. The controllably opening water supply line door assembly of claim 14, wherein a first end of the pneumatic device is attached to the bracket, and wherein a second end of the pneumatic device is attached to an interior surface of the water supply line.

16. The controllably opening water supply line door assembly of claim 11, wherein the door is configured to be sealed by a single bolt that passes through at least one of the plurality of base connection mechanisms and at least one of the at least two door connection mechanisms, and that engages the water supply line.

17. A system comprising:
   a saddle that is configured to engage an outer surface of a water supply line;
   a riser that is joined to the saddle; and
   a controllably opening water supply line door assembly attached to the riser, wherein the controllably opening water supply line door assembly comprises:
      a base comprising a first planar and circular piece of material, wherein the base further comprises a plurality of base connection mechanisms;
      a door comprising a second planar piece of material and having a first surface that is configured to face an interior of the water supply line and a second surface that is configured to face a body of water, wherein the door comprises at least two door connection mechanisms;
      a bracket located at the first surface of the door;
      an actuating mechanism that is configured to apply a force to the door, via the bracket, to open and close the door; and
      a hinge structure that is joined to the base and the door, wherein the hinge structure comprises a hinge, wherein the door is configured to rotate about an axis formed by the hinge to create a passageway into the riser, and wherein the door is configured to be controllably opened remotely.

18. The system of claim 17, wherein water flows into the water supply line from the body of water when the door is opened.

19. The system of claim 18, wherein the actuating mechanism comprises a pneumatic device.

20. The system of claim 19, wherein a first end of the pneumatic device is attached to the bracket, and wherein a second end of the pneumatic device is attached to an interior surface of the water supply line.

\* \* \* \* \*